United States Patent
Chow et al.

(10) Patent No.: US 9,433,893 B2
(45) Date of Patent: Sep. 6, 2016

(54) CONFIGURATIONS AND METHODS FOR ADVANCED OXYGEN ENRICHMENT FOR SULFUR RECOVERY

(71) Applicant: FLUOR TECHNOLOGIES CORPORATION, Aliso Viejo, CA (US)

(72) Inventors: Ryan Chow, Irvine, CA (US); Thomas Chow, Irvine, CA (US)

(73) Assignee: Fluor Corporation, Sugar Land, TX (US)

( * ) Notice: Subject to any disclaimer, the term of this patent is extended or adjusted under 35 U.S.C. 154(b) by 5 days.

(21) Appl. No.: 14/633,008

(22) Filed: Feb. 26, 2015

(65) Prior Publication Data
US 2015/0273392 A1   Oct. 1, 2015

Related U.S. Application Data

(60) Provisional application No. 61/946,298, filed on Feb. 28, 2014.

(51) Int. Cl.
| | | |
|---|---|---|
| *C01B 17/04* | (2006.01) | |
| *B01J 19/24* | (2006.01) | |
| *B01D 53/52* | (2006.01) | |

(52) U.S. Cl.
CPC ............. *B01D 53/52* (2013.01); *B01J 19/24* (2013.01); *B01J 19/245* (2013.01); *C01B 17/046* (2013.01); *C01B 17/0456* (2013.01); *B01J 2219/00051* (2013.01); *B01J 2219/24* (2013.01); *Y02P 20/129* (2015.11)

(58) Field of Classification Search
CPC .... C01B 17/0404; B01D 53/52; B01J 19/24; B01J 2219/24; B01J 2219/00051
See application file for complete search history.

(56) References Cited

U.S. PATENT DOCUMENTS

| | | | | |
|---|---|---|---|---|
| 4,552,747 | A | * | 11/1985 | Goar .............. C01B 17/0413 423/244.09 |
| 4,849,203 | A | | 7/1989 | Palm |
| 7,108,842 | B2 | | 9/2006 | Ramani et al. |
| 7,357,908 | B2 | | 4/2008 | Ramani et al. |
| 2002/0098145 | A1 | | 7/2002 | Borsboom et al. |
| 2005/0135992 | A1 | * | 6/2005 | Chow .............. C01B 17/046 423/574.1 |
| 2005/0201924 | A1 | | 9/2005 | Ramani et al. |
| 2007/0134147 | A1 | | 6/2007 | Graville |
| 2008/0050306 | A1 | | 2/2008 | Keller et al. |
| 2010/0198407 | A1 | | 8/2010 | Wong et al. |
| 2012/0321548 | A1 | * | 12/2012 | Rameshni ........ C01B 17/0404 423/569 |

FOREIGN PATENT DOCUMENTS

| | | |
|---|---|---|
| DE | 3690569 C2 | 11/1987 |
| EP | 0078690 A2 | 5/1982 |
| EP | 0218302 A2 | 4/1987 |
| EP | 0220610 B1 | 5/1987 |
| EP | 0506161 B1 | 9/1992 |
| EP | 0565316 B1 | 10/1993 |

* cited by examiner

*Primary Examiner* — Timothy Vanoy
(74) *Attorney, Agent, or Firm* — Conley Rose, P.C.; Kristin Jordan Harkins

(57) ABSTRACT

Advanced oxygen enrichment technologies for Claus plants are presented that provide an oxygen rich gas stream to the Claus burner of the thermal stage and one or more oxygen rich bypass gas streams to at least one of the catalytic stages to so increase the capacity of the plant while reducing the amount of recycle gases needed for flame temperature moderation.

20 Claims, 1 Drawing Sheet

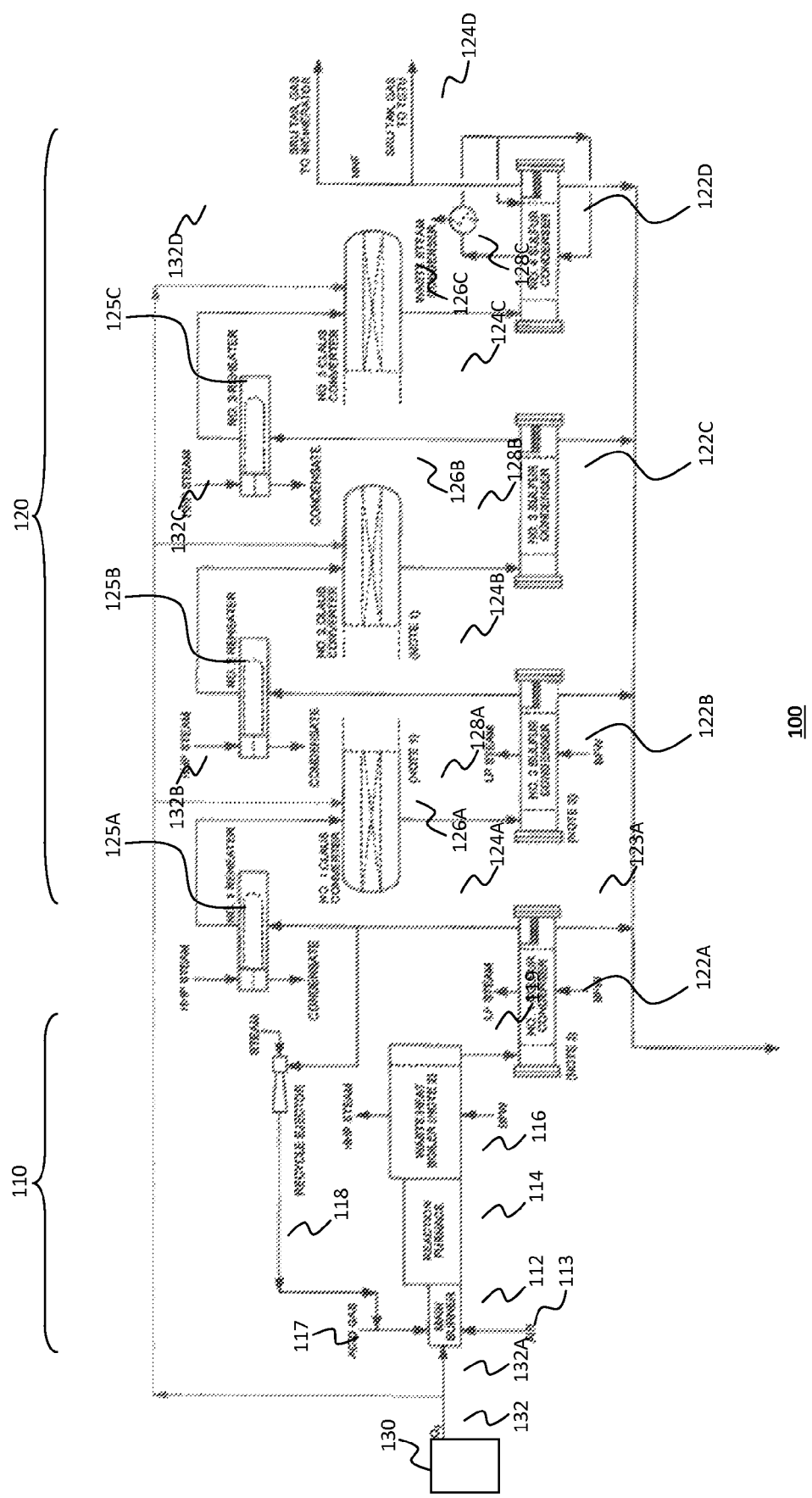

CONFIGURATIONS AND METHODS FOR ADVANCED OXYGEN ENRICHMENT FOR SULFUR RECOVERY

This application claims the benefit of priority to U.S. provisional application Ser. No. 61/946298, filed on Feb. 28, 2014.

FIELD OF THE INVENTION

The field of the invention is gas processing using Claus plants, especially as it relates to systems and methods for increasing capacity of Claus sulfur recovery/tail gas treating units (SRU/TGTU) with oxygen enrichment.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Sulfur recovery units are commonly used in refineries, gas plants, and/or gasification plants, and with the increase of sourness of crude oil, gas, and/or coal, there is an increased demand on processing capacity of existing sulfur recovery units (SRUs) and/or demand for new SRUs.

Conventional Claus technology typically employs air as the combustion medium in the reaction furnace to facilitate the Claus reaction for sulfur recovery. While the nitrogen component of air does not participate in the Claus reaction, it occupies a significant amount of the equipment processing capacity, thus contributing to an increased equipment size. To reduce such disadvantage, at least some of the nitrogen can be replaced with oxygen, which allows for an increased acid gas processing capacity, and which in turn allows for smaller equipment size of new SRU/TGTU (tail gas treatment unit) facilities and increased acid gas processing capacity of existing SRU/TGTUs.

Use of such oxygen enrichment, however, is generally limited because the operating flame temperature of the burner increases with increased levels of oxygen and may reach or even exceed the design temperature of the refractory material. Therefore, flame temperature is typically the limiting factor controlling maximum tolerable oxygen levels in the oxygen enriched air, which in turn limits the increase in processing capacity of existing equipment. For example, H2S levels in SRU feed gases in refining plants are often in the range of 70% to 90%, and the flame temperature will usually reach or exceed refractory design temperature limitations at oxygen levels of 40-45% and above, limiting the increase in processing capacity to about 50-70% of the original equipment design capacity.

More recently, advances in oxygen enrichment have enabled high levels of oxygen enrichment to maximize increase in processing capacity of existing SRUs (e.g., 50%-200% of their original design capacity), and examples of such improvements are commercialized as SURE™ Technology (oxygen enrichment BOC, Guildford, Surrey, England) and COPE™ Technology (Claus Oxygen-based Process Expansion, Goar, Allison & Associates). The SURE technology uses a new reaction furnace/waste heat boiler (RF/WHB) to accommodate the extra oxygen needed while still limiting the amount of oxygen to be used in the existing reaction furnace for the flame to stay below the refractory design temperature limitation. As a consequence, a new reaction furnace/waste heat boiler (RF/WHB), and in most cases, a new sulfur condenser are needed in an existing SRU to achieve the desired processing capacity increase. The COPE technology employs a recycle cooled gas stream from the first sulfur condenser outlet back to the reaction furnace to so moderate flame temperature to below the design temperature limit of the refractory material. However, due to the relatively large quantities of recycle gas needed for moderating flame temperature, a new and bigger reaction furnace/WHB are often required to achieve a desired processing capacity increase.

Thus, even though several improvements have been made for oxygen enrichment in SRU/TGTUs, various drawbacks nevertheless remain. Among other things, relatively large volumes of recycle gas or new equipment to handle flame temperature increase are often economically unattractive. Consequently, there is still a need to provide improved oxygen enrichment in SRU/TGTU.

SUMMARY OF THE INVENTION

The inventive subject matter is drawn to various plants, systems, and methods of sulfur recovery in a Claus plant in which a portion of oxygen otherwise supplied to the Claus burner is bypassed to one or more downstream sulfur converters, while the cooled gas from at least one catalytic reactor is recycled back to the reaction furnace for temperature moderation. Preferred configurations and methods will advantageously minimize the amount of recycle gas and so minimize the size of a new Claus reaction furnace, waste heat boiler, and/or first sulfur condenser, or even entirely eliminate the need to upgrade or replace existing equipment.

In one aspect of the inventive subject matter, a gas processing plant includes a Claus reactor system with a thermal stage and a catalytic stage with one or more catalytic reactors, and a sulfur condenser is fluidly coupled between the thermal stage and the catalytic stage. Contemplated plants will also include an oxygen source that produces or provides an oxygen rich gas stream. Most typically, the thermal stage receives an acid gas stream, an air stream as needed, a recycle stream, and a first portion of the oxygen rich gas stream, while the catalytic reactor receives a gaseous effluent from the sulfur condenser and a second portion of the oxygen rich stream, thus producing a first catalytic reactor effluent. In contemplated plants, the recycle stream is a portion of the first gaseous effluent from the sulfur condenser, and a second sulfur condenser is coupled to the catalytic reactor to receive the catalytic reactor effluent and to produce a second a gaseous effluent.

While not limiting the inventive subject matter, second and third catalytic reactors may be included associated sulfur condensers. In such configurations, it should be appreciated that further portions of the oxygen rich gas stream may be supplied to the additional catalytic reactors such that the additional catalytic reactors receive a portion of the oxygen rich stream and upstream sulfur condenser effluents. It is further contemplated that the oxygen rich gas stream from the oxygen source has an oxygen content of at least 30 mol %, and/or that a control unit is implemented to adjust flow of the oxygen rich gas streams and the recycle stream to so maintain a predetermined temperature in the thermal stage.

Consequently, the inventors also contemplate a method of operating a Claus plant that includes a step of providing a Claus reactor system having a thermal stage with a burner and a reaction furnace, a catalytic stage with a first catalytic reactor, a first sulfur condenser fluidly coupled between the thermal stage and the catalytic stage, and an oxygen source that provides an oxygen rich gas stream. In another step, an acid gas stream, an air stream, a recycle stream, and a first portion of the oxygen rich gas stream are fed to the thermal stage, and in a further step, a first gaseous effluent from the first sulfur condenser and a second portion of the oxygen stream are fed to the first catalytic reactor to so produce a first catalytic reactor effluent. A portion of the first gaseous effluent from the first sulfur condenser is then used as the recycle stream. In yet another step, a second sulfur condenser is coupled to the first catalytic reactor to receive the first catalytic reactor effluent and to produce a second gaseous effluent.

Where desired or needed, contemplated methods will also include a step of feeding the second gaseous effluent from the second sulfur condenser and a second portion of the oxygen rich gas stream to a second catalytic reactor to produce a second catalytic reactor effluent, and feeding the second catalytic reactor effluent to a third sulfur condenser to produce a third gaseous effluent, and where further desired or needed a further step of feeding the third gaseous effluent from the third sulfur condenser and a third portion of the oxygen rich gas stream to a third catalytic reactor to produce a third catalytic reactor effluent, and feeding the third catalytic reactor effluent to a fourth sulfur condenser to produce a fourth gaseous effluent.

In contemplated aspects of the inventive subject matter, the thermal stage is operated to produce in the first gaseous effluent a H2S:SO2 ratio of greater than 2:1, and/or the first catalytic reactor comprises one or more catalysts that catalyze direction oxidation of H2S to elemental sulfur or to SO2 and a Claus reaction of H2S to elemental sulfur. Among other options, the first catalytic reactor comprises an iron promoted activated alumina catalyst or Titanium Oxide catalyst, or the first catalytic reactor may comprise an upstream catalyst that catalyzes direction oxidation of H2S to elemental sulfur or to SO2 and a lower bed of catalyst that catalyzes a Claus reaction of H2S to elemental sulfur.

As noted above, the oxygen rich gas stream from the oxygen source may have an oxygen content of at least 30 mol %, and it is further contemplated that less than 80% of the oxygen rich gas stream may be fed to the thermal stage as the first portion of the oxygen rich gas stream. Where desired, contemplated methods will also include a step of using a control unit to adjust flow of the first and second oxygen rich gas streams and the recycle stream to thereby maintain a predetermined temperature in the thermal stage.

Thus, and viewed from a different perspective, the inventors also contemplate a method of improving sulfur production capacity of a Claus gas processing plant having a Claus reactor system that includes a thermal stage with a burner and a reaction furnace, a catalytic stage with a first catalytic reactor, a first sulfur condenser fluidly coupled between the thermal stage and the catalytic stage, and an oxygen source that provides an oxygen rich gas stream. Such method will advantageously include the steps of feeding to the thermal stage an acid gas stream, an air stream, a recycle stream, and a first portion of the oxygen rich gas stream to produce a thermal stage effluent; condensing elemental sulfur form the thermal stage effluent to form a first gaseous effluent; using a portion of the first gaseous effluent as the recycle stream to thereby control a temperature in the thermal stage; and feeding another portion of the first gaseous effluent into the first catalytic reactor and feeding a second portion of the oxygen rich gas stream into the first catalytic reactor to thereby reduce flow of the recycle stream and increase flow of the acid gas stream.

In exemplary methods, the second portion of the oxygen rich gas stream is at least 5 vol % of the oxygen rich gas stream from the oxygen source, and/or the oxygen rich gas stream from the oxygen source has an oxygen content of at least 30 mol %. Moreover, it is contemplated that the first catalytic reactor in such methods includes one or more catalysts that catalyze direction oxidation of H2S to elemental sulfur or to SO2 and a Claus reaction of H2S to elemental sulfur.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is an exemplary schematic of an advanced oxygen enrichment technology for a Claus plant that increases acid gas processing capacity.

DETAILED DESCRIPTION

The inventors have discovered that sulfur processing capacity can be increased in an oxygen enrichment Claus plant or regular Claus plant while avoiding or reducing the need for increased equipment size in a SRU/TGTU in a relatively simple and effective manner. In especially preferred aspects of the inventive subject matter, a portion of the oxygen stream that is fed to the thermal stage Claus burner is also fed to at least one downstream catalytic reactor that ordinarily catalyzes a Claus reaction as described in more detail below. In such configurations and methods, it should be appreciated that the amount of recycle gas that is otherwise needed to moderate temperature in the thermal stage can be substantially reduced as some of the oxygen is diverted to one or more of the downstream catalytic reactors. Thus, it should also be appreciated that the plant configurations and methods presented herein use an oxygen feed to a Claus reaction in the catalytic stage.

In one exemplary aspect of the inventive subject matter as schematically illustrated in FIG. 1, a Claus plant 100 with oxygen enrichment has a thermal stage 110 and a catalytic stage 120. Oxygen source 130 is coupled to the thermal stage 110 and catalytic stage 120 as is further discussed in more detail below. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In the example of FIG. 1, the oxygen source 130 provides an oxygen rich gas stream 132, typically having an oxygen content above that of ambient air (e.g., at least 30 mol %). Thermal stage 110 includes a burner 112 and reaction furnace 114 and is coupled to a waste heat boiler 116. Burner 112 is configured to receive a first portion of the oxygen rich gas stream 132A, an acid gas stream 117, a recycle stream 118, and where desired or necessary an air stream 113. Most typically, the acid gas stream 117 will include at least 5 mol % H2S (e.g., between 15-80 mol %), and burner 112 is operated using the first portion of the oxygen rich gas stream 132A and air stream 113 such that a desired fraction of the H2S is converted to SO2 to thereby support a Claus reaction in which elemental sulfur is produced. Most typically, a control unit (not shown here) is coupled to the thermal stage and conduits feeding the various streams to the thermal and catalytic stages and controls the flow of the streams such that the thermal stage effluent has a ratio of H2S:SO2 of at least 2:1 (e.g., 2.5:1, or 3:1, or 5:1, or even higher).

Thermal stage effluent 119 is fed to first sulfur condenser 122A and cooled below the dew point of sulfur to so produce a liquid sulfur product 123A and a first gaseous effluent 124A, of which one portion is recycled back as stream 118 to the thermal stage 110 for temperature control in the burner/furnace to maintain the temperature at or below a rated nominal operational temperature for the refractory material. Of course, it should be appreciated that the quantity of the recycle gas will predominantly depend on the concentration of the H2S in the acid gas stream 117 and the quantity of oxygen delivered via stream 132A. Most typically, the recycle stream 118 will be between about 5% and 25% of the total volume of first gaseous effluent 124A. After reheating the remainder of first gaseous effluent 124A in the reheater 125A, the reheated stream is fed to a first catalytic reactor 126A that also receives a second portion of the oxygen stream 132B. Most typically the second portion of the oxygen stream 132B will be between about 2-20 vol % of the oxygen rich gas stream 132, and the exact quantity will in most cases depend on the type and activity of catalyst in the first catalytic reactor 126A and the ratio of H2S:SO2 in the first gaseous effluent 124A.

First catalytic reactor 126A is typically a conventional catalytic reactor for a Claus plant and the particular configuration and/or size may vary considerably and will mostly depend on the requirements of the Claus plant and volume/composition of acid gas that is to be treated. However, with respect to the catalyst(s) employed in the first catalytic reactor 126A, it should be noted that the catalytic reactor will have catalyst(s) that catalyze the direct oxidation of H2S to elemental sulfur (in contrast to selective oxidation of H2S to SO2), or to SO2) and that also catalyze a Claus reaction of H2S & SO2 to elemental sulfur. In such case, an intervening oxygen scavenger bed is preferably located between the upstream direct oxidation catalyst and the downstream Claus catalyst. Alternatively, suitable catalysts also include those that are tolerant to oxygen and catalyze a Claus reaction (e.g., iron promoted activated alumina catalysts and titanium type catalysts that have the capability of converting H2S to SO2 or to elemental sulfur in the presence of O2 and also catalyze the H2S/SO2 to elemental sulfur (Claus) reaction).

First catalytic reactor 126A produces first catalytic reactor effluent 128A that is fed to the second sulfur condenser 122B where elemental sulfur is removed from the cooled catalytic reactor effluent. Following the same sequence as for the first catalytic reactor 126A, the second gaseous effluent 124B from the second sulfur condenser 122B is reheated in the reheater 125B and is then fed to the second catalytic reactor 126B together with the third portion of the oxygen stream 132C. With respect to the second catalytic reactor 126B, the same considerations and concepts as provided for first catalytic reactor 126A apply. Second catalytic reactor 126B thus produces second catalytic reactor effluent 128B that is fed to the third sulfur condenser 122C where elemental sulfur is removed from the cooled catalytic reactor effluent. The so generated third gaseous effluent 124C from the third sulfur condenser 122C is reheated in the reheater 125C and fed to the third catalytic reactor 126C together with the fourth portion of the oxygen stream 132D. With respect to the third catalytic reactor 126C, the same considerations and concepts as provided for first catalytic reactor 126A apply. Third catalytic reactor 126C thus produces third catalytic reactor effluent 128C that is fed to the fourth sulfur condenser 122D where elemental sulfur is removed from the cooled catalytic reactor effluent. The so generated fourth gaseous effluent 124D from the fourth sulfur condenser 122D is then fed to a tail gas processing plant or an incinerator as best appropriate.

It should be noted that typical currently known enhancements of Claus Technology (COPE) require recycling of substantial quantities of cooled acid gas from the first sulfur condenser to the Claus reaction furnace as already noted above. Unfortunately, such large quantities of recycle gas will often require new equipment that is significantly larger than that of a conventional air-based Claus operation, and in the case of revamping of existing Claus facilities, will require replacing existing equipment (i.e., Claus burner, waste heat boiler, and/or first sulfur condenser equipment). Therefore, and viewed from a different perspective, oxygen enrichment level is generally limited by the rapid temperature rise and concurrent substantial demand for recycle gas.

In contrast, where a suitable portion of oxygen is diverted to the downstream catalytic reactors (in addition to provision of oxygen to the furnace), and where recycle gas is fed back to the burner/furnace of the thermal stage, numerous benefits are realized beyond temperature control. For example, it should be appreciated that such oxygen diversion will minimize the quantity of recycle gas needed for flame temperature moderation, which in turn minimizes the size of the Claus reaction furnace, waste heat boiler, and/or first sulfur condenser, and even entirely eliminates the need to replace existing equipment in a plant upgrade situation. Moreover, while some of the temperature rise in the thermal stage could be shifted in a non-recycling gas configuration to a catalytic stage that includes a selective oxidation catalyst (i.e., catalyst that selectively converts H2S to SO2 only) temperature control in the thermal stage would be lacking. In contrast, where recycling gas is employed for temperature control and where a direct oxidation catalyst (i.e., catalyst that converts H2S to elemental S) or an oxygen-tolerant Claus catalyst is used, higher sulfur production capacity can be achieved. Still further, it should be noted that addition of oxygen to a conventional Claus catalytic reactor is generally avoided in the art as presence of oxygen typically leads to rapid catalyst degradation (e.g., due to sulfation and/or surface inactivation).

With respect to the catalysts in the first, second, and/or subsequent catalytic reactors it is contemplated that all catalysts are suitable that directly or indirectly catalyze a reaction between oxygen and H2S to form elemental sulfur, and especially preferred catalysts include direct oxidation catalysts (i.e., catalyzing oxidation of H2S to elemental sulfur), oxygen-sensitive Claus catalysts, as are well oxygen-tolerant catalysts that catalyze a Claus reaction (e.g., titanium type catalysts that have the capability of (a) converting H2S components to SO2 in the presence of oxygen, and (b) carry out the H2S/SO2 to elemental sulfur (Claus) reaction). Moreover, it should be appreciated that the catalytic reactor may also include one or more oxygen scavenger beds, typically upstream of a catalyst bed that is sensitive to oxygen. Therefore, contemplated catalytic reactors may include only one type of catalyst, and especially preferred single catalyst reactors will operate with an oxygen-tolerant catalyst that catalyzes a Claus reaction (e.g., titanium type catalyst). In such case, oxygen will be preferably consumed by a reaction with H2S to ultimately produce elemental sulfur using the same catalyst as noted above. On the other hand, two or more types of catalysts may be employed where the first catalyst catalyzes a direct oxidation of H2S to elemental sulfur, and where the second catalyst is a conventional Claus catalyst that converts H2S and SO2 to elemental sulfur. Where desired, an oxygen scavenger catalyst/bed may be interposed between the first and second catalyst. It should be noted that due to the use of bypass oxygen to the catalytic reactors, the use of recycle gas to the thermal stage, and enhanced formation of elemental sulfur using the above catalysts, the processing capacity for H2S is significantly increased. It should also be noted that the systems and methods presented herein are expected not only to save capital expenditure, but will also shorten revamp project schedules and/or mitigate unnecessary or prolonged shutdowns of existing sulfur recovery units during revamp.

In further contemplated aspects of the inventive subject matter, it must be appreciated that the thermal stage is generally operated to ensure stoichiometric excess of H2S over SO2 (with respect to a conventional Claus reaction) to so accommodate for the bypass oxygen to the catalytic reactors. Therefore, suitable ratios of H2S:SO2 will be between 2.0:1 and 2.3:1, between 2.3:1 and 3:1, between 3:1 and 4:1, between 4:1 and 5:1, or between 5:1 and 6:1, and even higher. Viewed form a different perspective, suitable ratios of H2S:SO2 will be at least 2.5:1, at least 3:1, at least 4:1, or at least 5:1.

With respect to the oxygen stream it should be recognized that all types of oxygen-containing streams are suitable that have an oxygen concentration above that of ambient air. Therefore, suitable oxygen streams include those having at least 30 mol %, more typically at last 70 mol %, and most typically at least 90 mol % $O_2$ (e.g., at least 98 or 99 mol %). In most cases, the amount of the diverted oxygen to the downstream converters will depend, among other factors, on the acid gas concentration, the amount of oxygen delivered to the main burner, and the number of downstream Claus catalytic reactors. However, it is generally contemplated that the fraction of total diverted oxygen is between 0.1 and 80 vol %, more typically between 1 and 60 vol %, and most typically between 10 and 50 vol % of the stream from the oxygen source. Unless the context dictates the contrary, all ranges set forth herein should be interpreted as being inclusive of their endpoints, and open-ended ranges should be interpreted to include commercially practical values. The recitation of ranges of values herein is merely intended to serve as a shorthand method of referring individually to each separate value falling within the range. Unless otherwise indicated herein, each individual value is incorporated into the specification as if it were individually recited herein.

Moreover, it should be appreciated that the downstream Claus catalytic reactors need not necessarily receive the same quantities of oxygen, and that in fact one or more of the converters may not receive any oxygen at all Likewise, it is generally preferred that the cooled recycle gas is obtained from the first sulfur condenser. However, a portion of the recycle gas may also be obtained from a second or third (or even further downstream) condenser.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. Lastly, as used in the description herein and throughout the claims that follow, the meaning of "a," "an," and "the" includes plural reference unless the context clearly dictates otherwise, and the meaning of "in" includes "in" and "on" unless the context clearly dictates otherwise.

What is claimed is:

1. A gas processing plant, comprising:
a Claus reactor system having a thermal stage comprising a burner and a reaction furnace, a catalytic stage comprising a first catalytic reactor, a first sulfur condenser fluidly coupled between the thermal stage and the catalytic stage, and an oxygen source configured to provide an oxygen rich gas stream;
wherein the thermal stage is configured to receive an acid gas stream, an air stream, a recycle stream, and a first portion of the oxygen rich gas stream;
wherein the first catalytic reactor is configured to receive a first gaseous effluent from the first sulfur condenser and a second portion of the oxygen stream, and to produce a first catalytic reactor effluent;
wherein the recycle stream is a portion of the first gaseous effluent from the first sulfur condenser; and
a second sulfur condenser fluidly coupled to the first catalytic reactor and configured to receive the first catalytic reactor effluent and to produce a second gaseous effluent.

2. The gas processing plant of claim 1 further comprising a second catalytic reactor that is configured to receive the second gaseous effluent from the second sulfur condenser and a third portion of the oxygen rich gas stream, and further comprising a third sulfur condenser fluidly coupled to the second catalytic reactor and configured to produce a third gaseous effluent.

3. The gas processing plant of claim 2 further comprising a third catalytic reactor that is configured to receive the third gaseous effluent from the third sulfur condenser and a fourth portion of the oxygen rich gas stream, and further comprising a fourth sulfur condenser fluidly coupled to the third catalytic reactor and configured to produce a fourth gaseous effluent.

4. The gas processing plant of claim 1 wherein the first catalytic reactor comprises an upstream catalyst bed having a first catalyst that catalyzes a direct oxidation of hydrogen sulfide to sulfur, or to H2S and a downstream catalyst bed having a second catalyst that catalyzes a Claus reaction.

5. The gas processing plant of claim 1 wherein the oxygen rich gas stream from the oxygen source has an oxygen content of at least 30 mol %.

6. The gas processing plant of claim 1 further comprising a control unit that is configured to adjust flow of the first and second oxygen rich gas streams and the recycle stream to so maintain a predetermined temperature in the thermal stage.

7. A method of operating a Claus plant, comprising:
providing a Claus reactor system having a thermal stage with a burner and a reaction furnace, a catalytic stage with a first catalytic reactor, a first sulfur condenser fluidly coupled between the thermal stage and the catalytic stage, and an oxygen source that provides an oxygen rich gas stream;
feeding to the thermal stage an acid gas stream, an air stream, a recycle stream, and a first portion of the oxygen rich gas stream;
feeding to the first catalytic reactor a first gaseous effluent from the first sulfur condenser and a second portion of the oxygen stream to so produce a first catalytic reactor effluent;
using a portion of the first gaseous effluent from the first sulfur condenser as the recycle stream; and
coupling a second sulfur condenser to the first catalytic reactor to receive the first catalytic reactor effluent and to produce a second gaseous effluent.

8. The method of claim 7 further comprising a step of feeding the second gaseous effluent from the second sulfur condenser and a third portion of the oxygen rich gas stream to a second catalytic reactor to produce a second catalytic reactor effluent, and feeding the second catalytic reactor effluent to a third sulfur condenser to produce a third gaseous effluent.

9. The method of claim 8 further comprising a step of feeding the third gaseous effluent from the third sulfur condenser and a fourth portion of the oxygen rich gas stream to a third catalytic reactor to produce a third catalytic reactor effluent, and feeding the third catalytic reactor effluent to a fourth sulfur condenser to produce a fourth gaseous effluent.

10. The method of claim 7 wherein the thermal stage is operated to produce in the first gaseous effluent a H2S:SO2 ratio of greater than 2:1.

11. The method of claim 7 wherein the first catalytic reactor comprises one or more catalysts that catalyze a direct oxidation of H2S to elemental sulfur or to SO2 and a Claus reaction of H2S to elemental sulfur.

12. The method of claim 7 wherein the first catalytic reactor comprises an iron promoted activated alumina catalyst or Titanium Oxidation catalyst.

13. The method of claim 7 wherein the first catalytic reactor comprises an upstream catalyst that catalyzes direction oxidation of H2S to elemental sulfur and a downstream catalyst that catalyzes a Claus reaction of H2S to elemental sulfur.

14. The method of claim 7 wherein the oxygen rich gas stream from the oxygen source has an oxygen content of at least 30 mol %.

15. The method of claim 7 further comprising a step of using a control unit to adjust flow of the first and second oxygen rich gas streams and the recycle stream to thereby maintain a predetermined temperature in the thermal stage.

16. The method of claim 7 wherein less than 80% of the oxygen rich gas stream is fed to the thermal stage as the first portion of the oxygen rich gas stream.

17. A method of improving sulfur production capacity of a Claus gas processing plant having a Claus reactor system that includes a thermal stage with a burner and a reaction furnace, a catalytic stage with a first catalytic reactor, a first sulfur condenser fluidly coupled between the thermal stage and the catalytic stage, and an oxygen source that provides an oxygen rich gas stream, the method comprising:
feeding to the thermal stage an acid gas stream, an air stream, a recycle stream, and a first portion of the oxygen rich gas stream to produce a thermal stage effluent;
condensing elemental sulfur from the thermal stage effluent to form a first gaseous effluent;
using a portion of the first gaseous effluent as the recycle stream to thereby control a temperature in the thermal stage; and
feeding another portion of the first gaseous effluent into the first catalytic reactor and feeding a second portion of the oxygen rich gas stream into the first catalytic reactor to thereby reduce flow of the recycle stream and increase flow of the acid gas stream.

18. The method of claim 17 wherein the second portion of the oxygen rich gas stream is at least 5 vol % of the oxygen rich gas stream from the oxygen source.

19. The method of claim 17 wherein the oxygen rich gas stream from the oxygen source has an oxygen content of at least 30 mol %.

20. The method of claim 17 wherein the first catalytic reactor includes one or more catalysts that catalyze direction oxidation of H2S to elemental sulfur or to SO2 and a Claus reaction of H2S to elemental sulfur.

* * * * *